US00RE41269E

(19) United States
(12) Reissued Patent
Hundt et al.

(10) Patent Number: US RE41,269 E
(45) Date of Reissued Patent: Apr. 27, 2010

(54) METHOD FOR PRODUCING INDUCTIVE COMPONENTS

(75) Inventors: Harald Hundt, Dieburg (DE); Klemens Trabold, Eisenfeld (DE)

(73) Assignee: Vacumschmelze GmbH & Co. KG, Hanau (DE)

(21) Appl. No.: 11/305,815

(22) PCT Filed: Aug. 10, 1999

(86) PCT No.: PCT/DE99/02493

§ 371 (c)(1),
(2), (4) Date: Mar. 22, 2001

(87) PCT Pub. No.: WO00/10180

PCT Pub. Date: Feb. 24, 2000

Related U.S. Patent Documents

Reissue of:
(64) Patent No.: 6,663,815
Issued: Dec. 16, 2003
Appl. No.: 09/762,574
Filed: Mar. 22, 2001

(30) Foreign Application Priority Data

Aug. 10, 1998 (DE) ..... 198 36 146

(51) Int. Cl.
*B29C 70/72* (2006.01)

(52) U.S. Cl. ..... 264/272.19; 264/272.2; 29/602.1; 29/605

(58) Field of Classification Search ..... None
See application file for complete search history.

(56) References Cited

U.S. PATENT DOCUMENTS 4,210,859 A * 7/1980 Meretsky et al. ..... 323/331
4,910,861 A 3/1990 Dohogne
5,038,460 A 8/1991 Ide et al.
5,144,745 A 9/1992 Yoshimura et al.
5,331,730 A 7/1994 Brinn, Jr.
5,871,681 A 2/1999 Karino et al.
5,973,424 A * 10/1999 Engelberger et al. ..... 310/43
6,038,760 A 3/2000 Antoine et al.
6,103,157 A 8/2000 Behm et al.
6,682,681 B1 * 1/2004 Clark et al. ..... 264/263

FOREIGN PATENT DOCUMENTS

DE 2242958 3/1974
DE 4426138 2/1996
JP 57122506 A 7/1982
JP 2111003 A 4/1990
JP 8318542 A 12/1996

OTHER PUBLICATIONS

An Office Action dated Jun. 23, 2009 for Japanese Patent Publication No. 2000–565549 (expressed in the German language).
English translation of the Office Action dated Jun. 23, 2009 for Japanese Patent Publication No. JP 2000–565549.
Statement of Verification of Translation regarding the English translation of the Office Action dated Jun. 23, 2009 for Japanese Patent Publication No. JP 2000–565549 executed by Wallie Dayal of Morningside Translations.

(Continued)

*Primary Examiner*—Edmund H. Lee
(74) *Attorney, Agent, or Firm*—Buchanan Ingersoll & Rooney PC

(57) ABSTRACT

Discussed are rational, economical production methods for inductive components. Compared to prior methods, those addressed herein are significantly simplified processes in which exact positioning of the connections is possible. Among actions contemplated in exemplary versions of the method are providing a mold comprised of aluminum alloy, inserting a magnet core of the inductive component, and filling the closed mold with a molten hot-melt adhesive preferably comprising a polyamide base.

14 Claims, 1 Drawing Sheet

OTHER PUBLICATIONS

Patent Abstract of Japan, vol. 005, No. 186 (E0984), Nov. 25, 1981.

Japanese Patent Application Abstract 56–112710, Sep. 5, 1981.

J. Patterson, et al., "Encapsulation of Sensors, Solenoids and Transformers With Engineering Thermoplastics, " Proceedings of the Electrical Electronics Insulation Conference, Sep. 18, 1995, pp. 1–6.

G. Blinne, et al., "Konstruktionskunstoffe fur die Electrotechnik, " Systeme und Konupanenten, Jun. 1996, pp. 40–42.

* cited by examiner

METHOD FOR PRODUCING INDUCTIVE COMPONENTS

Matter enclosed in heavy brackets [ ] appears in the original patent but forms no part of this reissue specification; matter printed in italics indicates the additions made by reissue.

FIELD OF THE INVENTION

The invention relates to a method for producing inductive components, especially current transformers for electric power meters.

BACKGROUND OF THE INVENTION

Current transformers are inductive components that through their design with respect to imaging response and phase error enable precise acquisition of mains current in industrial meters as well as household meters. In combination with evaluation electronics they are now replacing the so-called Ferraris watt-meters (three-phase meters).

It is commonly known that such current transformers as well as other inductive components such as transformers for power supplies, chokes and repeaters can be produced on the basis of magnet cores affixed or molded in plastic housings. Here a magnet core provided with one winding or several windings is inserted in a thermoplastic housing and immersed in a molding resin generally consisting of polyurethane or epoxy resin. This causes numerous problems as regards outlets for the connecting cables from the windings. Providing outlets for the connecting cables through the molded surface demands precise positioning of the cable during the molding process. This generally requires the use of so-called molding pallets with cable fixtures. The use of such molding pallets is very costly.

A further possibility is to fasten the cable in a double groove on the upper edge of the housing. This, however, frequently leads to a discharge of molding resin as a consequence of capillary attraction through the groove.

A cable guide through a hole drilled in the wall of the housing requires additional sealing and hence additional cost which is economically disadvantageous.

SUMMARY OF THE INVENTION

The goal of the present invention, therefore, is to present a new method for producing inductive components, especially current transformers, that by a wide margin avoids the above-mentioned problems.

According to the invention this goal is achieved through a method for producing inductive components with the following steps:

1. Providing a metallic mold;
2. Inserting the magnet core provided with at least one winding in the mold;
3. Closing the mold;
4. Filling the mold with a molten, hot-melt adhesive material under pressure;
5. Defined cooling of the mold;
6. Opening the mold and withdrawing the molded inductive component.

This method greatly simplifies the production sequence in comparison to existing technology, which leads to noticeably lower costs.

The molds employed generally consist of aluminum or aluminum alloy, which cost significantly less than the injection molds used for the housing in existing technology. The use of these molds also enables significantly shorter product introduction cycles in comparison to existing technology, as the molds are significantly simpler. This leads to rapid and simple changes for customized versions of the inductive components.

Filling with molten, hot-melt adhesive material is carried out preferably at a pressure of from 0 to 20 bar, preferably from about 10 to 20 bar, with the hot-melt adhesive material consisting of a polyamide-based thermoplastic hot-melt adhesive. In particular this refers to a polyamide-based hot-melt adhesive free from filler material. Use of this polyamide hot-melt adhesive significantly increases opportunities for recycling the inductive components, as only a single plastic is used for these inductive components. In particular several polyamide hot-melt adhesives can be composted. Moreover these thermoplastics do not have to be made from fossil materials such as oil or coal, but can also be made from renewable raw materials (wood resins).

In one version the connections from the winding or windings are led out of the mold in a clearly defined manner before the magnet core is inserted in the mold. Here cables are provided as connections. The cables are led out directly through grooves in the mold, whereby the special process prevents the discharge of hot-melt adhesive.

In another version the connections from the winding or windings in the mold are laid in blind holes. This enables the use of connections with relatively high bend resistance, so that the inventive method can also be used for producing inductive components directly suitable for surface-mount-devices (SMD).

The magnet cores consist preferably of toroidal cores made from metal alloys, in particular toroidal cores made from amorphous or nanocrystalline alloys. The use of such amorphous or nanocrystalline alloys in comparison to the crystalline alloys or ferrite cores used hitherto yields a substantial reduction in volume as well as better technical properties for the types of inductive components mentioned above. The benefit and properties of these amorphous or nanocrystalline alloys are fully described, for example, in EP 0271657 B1.

BRIEF DESCRIPTION OF THE DRAWINGS

The invention is shown by way of example in the drawing. Here.

DETAILED DESCRIPTION

Figure 1:
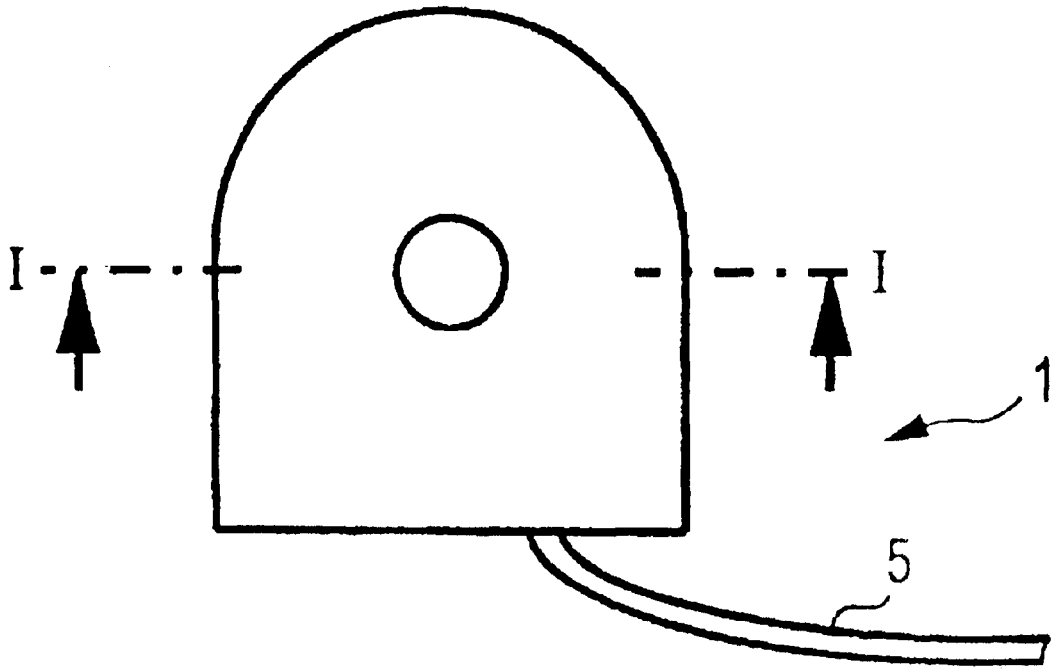
FIG. 1 represents a current transformer seen from above, produced by the inventive method.
Figure 2:
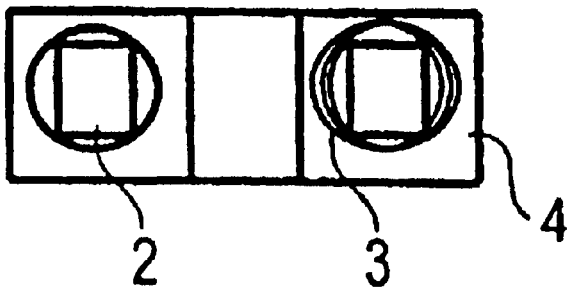
FIG. 2 represents a cross-section along line I—I through the current transformer from FIG. 1.

As shown in the figures, a current transformer 1 produced by the inventive method comprises a magnet core 2 provided with a secondary winding 3. The secondary winding 3 generally consists of several 100 to several 1000 windings. The secondary winding 3 in this current transformer 1 consists of relatively thin wire, that is the wire has a thickness of from 0.05 to 0.25 mm. The ends of the secondary winding 3 shown here are led out as a dual-strand connector 5, so that the current transformer 1 can be connected to a circuit board (not shown).

The magnet core 2 of the current transformer 1 shown here is a toroidal core made from an amorphous alloy. The toroidal core with the secondary winding 3 mounted on it was produced by the inventive low-pressure hot-melt molding method.

Here a mold made from aluminum alloy was provided (not shown). The toroidal core with the secondary winding 3 mounted on it was inserted in this mold, where the secondary winding 3 with its ends in the form of a dual strand connector 5 was led out of the mold. The mold was closed and filled with a molten, polyamide-based thermoplastic hot-melt adhesive under a pressure of about 15 bar. This caused a molded body 4 to surround the magnet core 2. In the region of the opening of the toroidal core the molded body 4 shows an opening 5 open at both ends through which the primary winding (not shown) of the current transformer 1 can be led.

Subsequently the mold underwent a defined cooling. After cooling, the mold was opened and the molded current transformer 1 was withdrawn. After withdrawal of the molded current transformer 1, the sprues were removed.

What is claimed is:

1. Method for producing inductive components comprising:

a. providing a metallic mold;

b. inserting into the mold (i) a toroidal core comprising metal alloy and with at least one winding and (ii) a winding connection, the winding connection being led out of the mold before the toroidal core is inserted;

c. closing the mold;

d. filling the mold with a molten, thermoplastic hot-melt adhesive material under pressure;

e. cooling the mold; and f. opening the mold and withdrawing the molded inductive component.

2. Method as in claim 1, in which the mold comprises aluminum or aluminum alloy.

3. Method as in claim 1, in which filling the mold with the hot-melt adhesive is carried out under a pressure of about 10 to 20 bar.

4. Method as in claim 1, in which the hot-melt adhesive is a polyamide-based thermoplastic hot-melt adhesive.

5. Method as in claim 1, in which the winding connections are laid in blind holes in the mold.

6. Method as in claim 1, in which the toroidal core is made of amorphous or nanocrystalline alloy.

7. Method as in claim 1, in which the inductive component functions as a current sensor.

8. Method for producing inductive components comprising:

a. providing a metallic mold comprising aluminum or aluminum alloy;

b. inserting into the mold (i) a toroidal core comprising amorphous or nanocrystalline alloy and with at least one winding and (ii) a winding connection, the winding connection being led out of the mold before the toroidal core is inserted;

c. closing the mold;

d. filling the mold with a molten, thermoplastic hot-melt adhesive material under pressure;

e. cooling the mold; and f. opening the mold and withdrawing the molded inductive component.

*9. Method for producing current transformers comprising:*

*a. providing a metallic mold;*

*b. inserting into the mold (i) a core comprising metal alloy and with at least one winding and (ii) a winding connection, the winding connection being led out of the mold before the core is inserted;*

*c. closing the mold;*

*d. filling the mold with a molten, thermoplastic hot-melt adhesive material under pressure;*

*e. cooling the mold; and*

*f. opening the mold and withdrawing the molded current transformer.*

*10. Method as in claim 9, in which the mold comprises aluminum or aluminum alloy.*

*11. Method as in claim 9, in which filling the mold with the hot-melt adhesive is carried out under a pressure of about 10 to 20 bar.*

*12. Method as in claim 9, in which the hot-melt adhesive is a polyamide-based thermoplastic hot-melt adhesive.*

*13. Method as in claim 9, in which the winding connections are laid in blind holes in the mold.*

*14. Method as in claim 9, in which the core is made of amorphous or nanocrystalline alloy.*

* * * * *